UNITED STATES PATENT OFFICE.

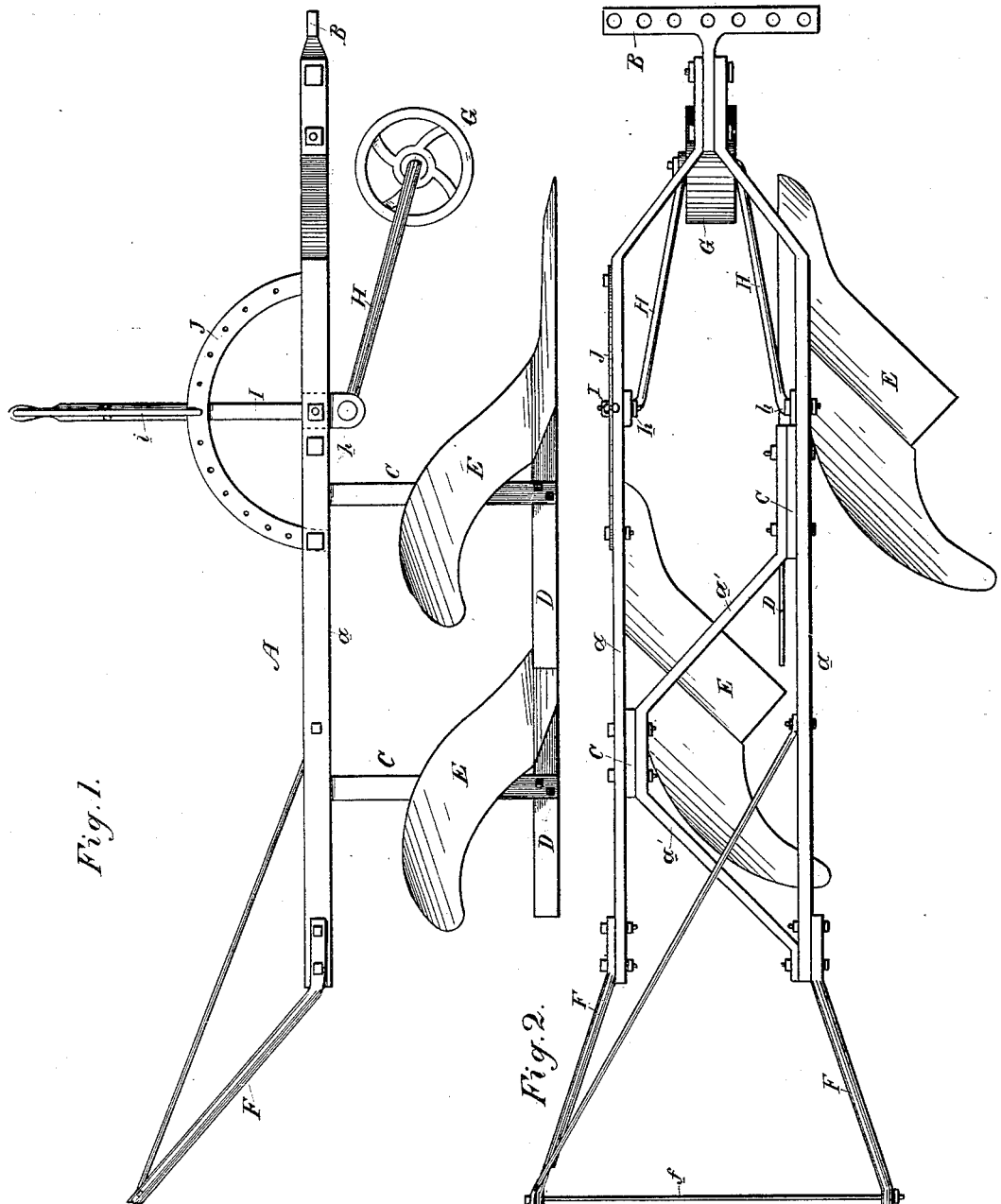

RASMUS B. JOHNSON, OF FRESNO, CALIFORNIA.

VINEYARD GANG-PLOW.

SPECIFICATION forming part of Letters Patent No. 318,563, dated May 26, 1885.

Application filed February 18, 1885. (No model.)

*To all whom it may concern:*

Be it known that I, RASMUS B. JOHNSON, of Fresno, county of Fresno, and State of California, have invented an Improvement in Vineyard Gang-Plows; and I hereby declare the following to be a full, clear, and exact description thereof.

My invention relates to that class of gang-plows which, on account of a lightness of construction, are specially adapted for use in vineyards, orchards, &c.

My invention consists in a simple and light frame of bar-iron carrying a plow on each side and brought to a longitudinal center forward, where the clevis is attached, and in a single guiding and adjusting wheel located centrally under the front of the frame and adapted to be adjusted by a peculiar crank and lever, all of which I shall hereinafter fully describe.

The object of my invention is to provide a light gang-plow having a center draft, and adapted to be perfectly and easily balanced on a single adjusting-wheel. The usual gang-plows have two wheels, one on each side, and their frames are not so constructed that a perfect center draft can be obtained. The wheels add to the weight and friction and make the plow clumsy; but with a single wheel located under the front center of a properly-centered frame I am enabled to construct a light and easily-handled plow.

Referring to the accompanying drawings, Figure 1 is a side elevation of my plow. Fig. 2 is a plan of same.

The frame, which is designated, generally, by A, consists of two bars, *a*, of iron, which extend parallel with each other to near the front, where they converge at the same angle, and thence forward again in parallel planes, receiving the clevis B between them. A bar, *a'*, is bolted to the inner side of the rear of one of the bars *a*, and thence extends diagonally forward to the other bar *a*, is bent parallel therewith, and thence at an angle forward to the first bar, as shown. It is bolted to said bars, and the top bars of the standards C intervene, whereby they are secured.

D are the landsides, and E the plow-bottoms.

F are the handles, which preferably are made of gas-pipe for the sake of lightness, and are bolted to the rear of the bars *a*. A transverse brace-rod, *f*, extends between the handles, and a diagonal brace-rod extends to the frame.

G is the balance and adjusting wheel. This is located under the front center of the frame A, whereby the weight of the whole plow is equally distributed on each side, thus permitting it to be readily balanced and handled. The construction of the frame and location of the wheel provide also for a center draft, which makes the plow easier to work. The wheel G is journaled in the lower forward ends of the double-armed crank H, the upper ends of which are journaled in bearings *h*, bolted to the frame. A lever, I, is secured to one of the arms of the crank, by which it is operated to raise or lower the wheel G, thereby regulating the depth of the plows and raising them clear of the ground when being transported. The lever I is provided with a pawl, *i*, which engages a curved rack, J, as shown.

These means for mounting and operating the balance-wheel are simple and effective, and the whole implement is light and strong, and well adapted for use in a vineyard or orchard.

Having thus described my invention, what I claim as new, and desire to secure by Letters Patent, is—

In a gang-plow, the frame A, the side bars of which are parallel, and have forward ends converging at the same angle and receiving the clevis between them, and the plow-bottoms E, secured one to each of the side bars of the frame, in combination with the wheel G, located under the front of and in the vertical plane of the central longitudinal line of the frame, the two-armed crank H, in which the wheel is mounted, the bearings *h* on the side bars of the frame, and the lever I, by which the crank is operated, substantially as and for the purpose herein described.

In witness whereof I have hereunto set my hand.

RASMUS B. JOHNSON.

Witnesses:
J. M. BRALY,
WM. FAYMONVILLE.